(12) United States Patent
Chen et al.

(10) Patent No.: US 10,536,587 B2
(45) Date of Patent: Jan. 14, 2020

(54) DOCUMENT SCANNING APPARATUS COMPOSED OF AN AUTOMATIC DOCUMENT FEEDING DEVICE AND AN IMAGE CAPTURING DEVICE AND SCANNING METHOD THEREOF

(71) Applicant: Foxlink Image Technology Co., Ltd., New Taipei (TW)

(72) Inventors: Chi Wen Chen, New Taipei (TW); Chi Cheng Chuang, New Taipei (TW); Hung Ming Chou, New Taipei (TW); Lung Chen, New Taipei (TW); Yao Shuo Chang, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 15/989,311

(22) Filed: May 25, 2018

(65) Prior Publication Data

US 2019/0191040 A1  Jun. 20, 2019

(30) Foreign Application Priority Data

Dec. 20, 2017  (TW) .............................. 106144744 A

(51) Int. Cl.
*H04N 1/00* (2006.01)
*H04N 1/195* (2006.01)

(52) U.S. Cl.
CPC ..... *H04N 1/00251* (2013.01); *H04N 1/00588* (2013.01); *H04N 1/00997* (2013.01); *H04N 1/19594* (2013.01)

(58) Field of Classification Search
CPC .......... H04N 1/00888; H04N 1/00323; H04N 1/00336; H04N 1/00891; H04N 1/00904; H04N 2201/0094
USPC .......................................................... 358/1.14
See application file for complete search history.

(56) References Cited

U.S. PATENT DOCUMENTS

| 6,151,464 A * | 11/2000 | Nakamura | H04N 1/32122 399/79 |
|---|---|---|---|
| 7,046,294 B1 * | 5/2006 | Sasaki | G03B 17/02 348/207.2 |
| 2008/0024836 A1 * | 1/2008 | Sundnes | H04N 1/00249 358/474 |

* cited by examiner

*Primary Examiner* — Tammy Paige Goddard
*Assistant Examiner* — Darryl V Dottin
(74) *Attorney, Agent, or Firm* — Lin & Associates Intellectual Property, Inc.

(57) ABSTRACT

The present invention relates to a document scanning apparatus which is composed of an automatic document feeding device and an image capturing device. The document scanning apparatus establishes a private area network between the automatic document feeding device and the image capturing device, and causes the automatic document feeding device to send a message to the image capturing device. When the message is received, said image capturing device performs corresponding operations in response to the message. Said operations may comprise, for example adjusting the relative position between the image capturing device and the automatic document feeding device or doing multi-documents scan.

13 Claims, 6 Drawing Sheets

DOCUMENT SCANNING APPARATUS COMPOSED OF AN AUTOMATIC DOCUMENT FEEDING DEVICE AND AN IMAGE CAPTURING DEVICE AND SCANNING METHOD THEREOF

CROSS-REFERENCE TO RELATED APPLICATION

The present application is based on, and claims priority from, Taiwan Patent Application No. 106144744, filed Dec. 20, 2017, the disclosure of which is hereby incorporated by reference herein in its entirety.

BACKGROUND OF THE INVENTION

1. Field of the Invention

The present invention relates to a document scanning apparatus, and more particularly to a document scanning apparatus which is easy to carry and has low cost.

2. The Related Art

Conventionally, a scanner and a computer are used to copy and store physical documents. The documents are scanned by the scanner and then transmitted to the computer for storage. However, for light users who only need to scan few documents per day, buying a scanner is not an economical solution. And for those who have the need to scan documents outside of the office room, the traditional scanner is too difficult to carry with. For those situations, it is more reasonable to capture document images with equipment on hand such as a camera or a smart phone. However, the image quality of the equipment is usually not as good as expected due to hand shake or poor exposure, and repeating operations for scanning multi-documents is quite annoying too. Such disadvantages make the use of scanning documents with smart phone far less effectiveness than a traditional scanner.

In view of shortcomings above, it is necessary to improve the traditional scanner and to provide a document scanning apparatus which is capable of providing the portability, low scanning cost and high image quality.

SUMMARY OF THE INVENTION

An objective of the present invention is to provide a document scanning apparatus which is composed of a smart phone and an automatic document feeding device. Said document scanning apparatus captures images with the image capturing unit of the smart phone and processes images with the image processing unit of the smart phone, so the document scanning apparatus is easier to carry and has reasonable cost of acquisition. Meanwhile, it can also provide features considered only provided by traditional scanners such as automatic feeding, document calibrating and exposure controlling.

To achieve the objective, the present invention includes the following contents:

A document scanning apparatus consists of an automatic document feeding device and an image capturing device. The automatic document feeding device includes a case which is composed of a lower housing and an upper cover pivotally connected to the lower housing; an internal space formed with the lower housing and the upper cover jointly; a document feeding assembly which is composed of a document feeding path and a paper feeding unit; the document feeding path disposed in the internal space which is provided with a scanning position; the paper feeding unit disposed in the internal space to feed the document through the document feeding path; a camera holder arranged on the surface of the case for securing the image capturing device in an orientation directing to the scanning position so as to capture the image of documents passing through the scanning position; and a signal transmitting module, sending different message to the image capturing device corresponding to the desired information.

The document scanning apparatus performs the following operations when scanning documents:

Establishing a private area network between the automatic document feeding device and the image capturing device; transmitting a message to the image capturing device through said private area network and causing said image capturing device to perform corresponding operations according to said message.

In summary, the document scanning apparatus in this invention provides an automatic document feeding device which is capable of feeding documents automatically, ensuring the exposure is correct and communicating with the image capturing device on hand such as smart phone or camera so that it is easier to carry and costs less money.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

In order to describe the technical content, structural characteristics, reached purpose and effectiveness of the following examples and details are credited with the schema.

The terms "paper" and/or "document" as used herein include, but not limit to, physical objects containing paper, film, or the like that being used as a carrier to record graphical and/or textual content.

Figure 1:
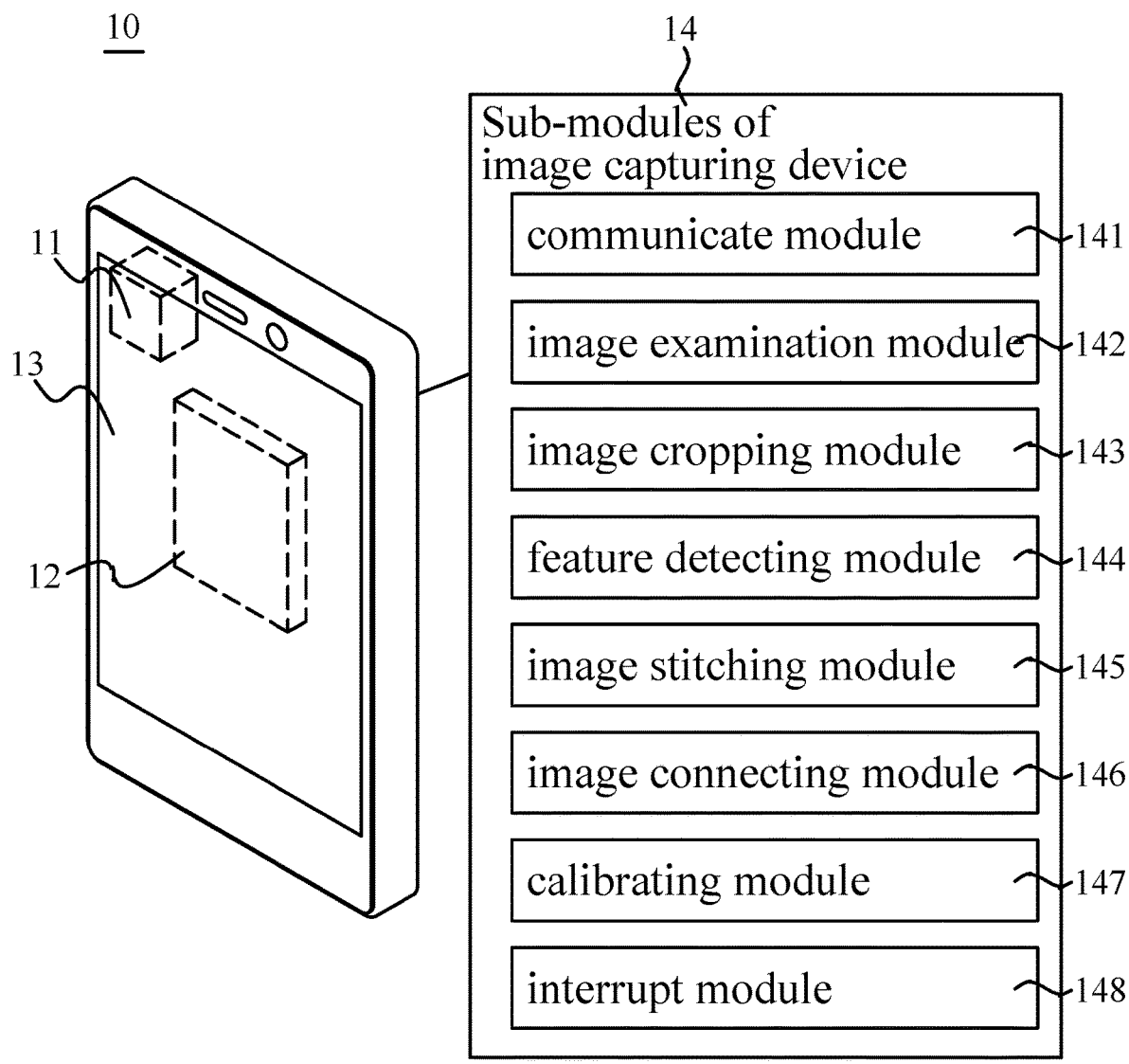
FIG. 1 shows a perspective view and a sub-module diagram of an image capturing device in a preferred embodiment.
Figure 2:
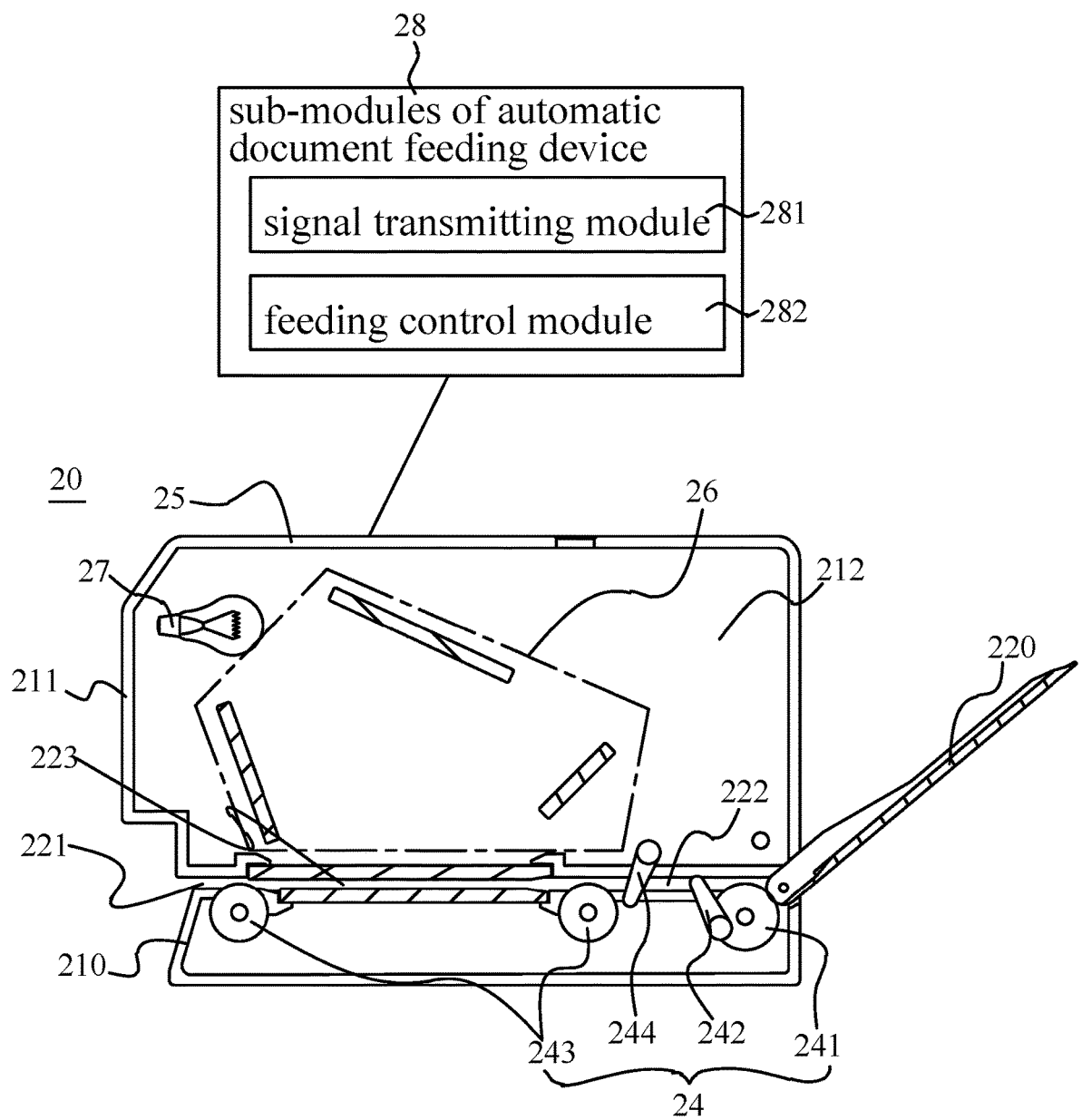
FIG. 2 shows a sectional view and a sub-module diagram of an automatic document feeding device in a preferred embodiment.
Figure 3:
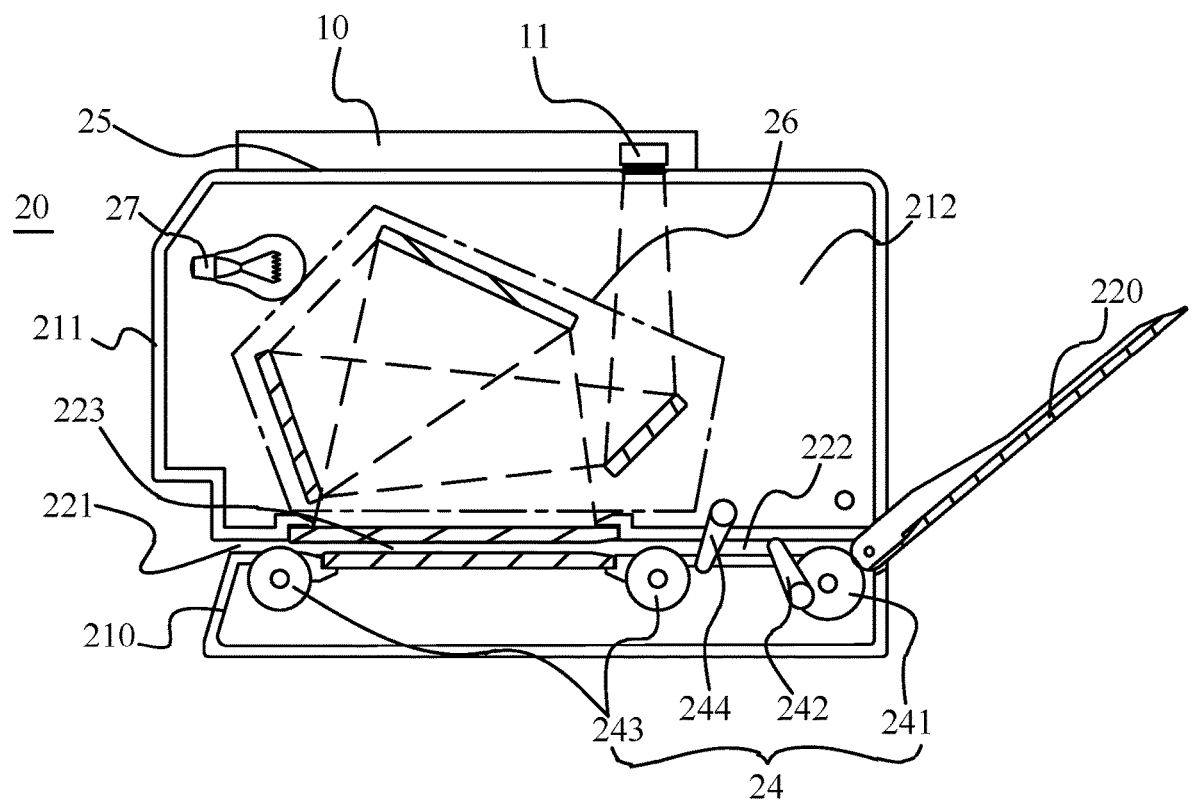
FIG. 3 shows a schematic diagram of a combination of the image capturing device and the automatic document feeding device in a preferred embodiment.

Reference is now made to FIGS. 1 to 3, a document scanning apparatus in the present invention is composed of an automatic document feeding device 20 and an image capturing device 10 which is separatably positioned on an outer surface of the automatic document feeding device 20. The automatic document feeding device 20 and/or the image capturing device 10 is provided with a computer-readable storage medium which stores various sub-modules which perform different operations when activated (described in detail later). In other words, the sub-modules 14 shown in FIG. 1 and sub-modules 28 shown in FIG. 2 are executable codes programmed to perform their corresponding operations described below.

The image capturing device 10 shown in this embodiment is a smart phone, and said smart phone includes: an image capturing unit 11 for capturing a document image and temporarily storing it in a native image linkage; an image processing unit 12 for extracting the image stored in the native image linkage and adjusting it correspondingly; and a touch screen panel 13 for displaying information and providing a controlling interface. The smart phone can also be equipped with additional dedicated or programmable controlling interface such as function buttons, selection buttons, joysticks or touch pads, and the technologies and features described above can also be implemented with other image capturing devices 10 other than smart phones, including but not limited to computers, personal digital assistants (PDAs), game devices, digital cameras, and the like that have image capturing function.

In a feasible embodiment, the image processing unit 12 includes the following sub-modules 14: a communication module 141 for receiving a message sent by the automatic document feeding device 20 and activating corresponding sub-modules; an image examination module 142 for extracting the document image temporarily stored in said native image linkage and checking image flaws such as bad exposures, misfocused, and skewed and suspending the photography to readjust parameters of the image capturing device 11 when any image flaws are detected; an image cropping module 143 for adjusting the contrast of the document image extracted from said native image linkage and cropping a desired image block from the document image, storing the image block in a cropped image linkage, and then deleting the document image stored in the native image linkage; a feature detecting module 144 for detecting and calculating the quantity of feature points in the image block, and further activating corresponding sub-modules according to the quantity of feature points; an image stitching module 145 for comparing feature points in different image blocks extracted from the cropped image linkage, the image stitching module searching for the same feature points that exist in different image blocks and using these same feature points to stitch different image blocks into a full-page document image; an image connecting module 146 for connecting different image blocks extracted from the cropped image linkage into a full-page document image by connecting in a fixed length; a calibrating module 147 for calculating the relative position between the image capturing device 10 and the automatic document feeding device 20 and further showing the instruction message for asking the user to minimize the relative position; and an interrupt module 148 for suspending the photography when at least one of abnormal states selected from an upper cover 211 is opened, an input tray 220 is emptied, a paper jam occurs in a document feeding path 222, and a stop command given by the user is detected.

The automatic document feeding device 20 includes: a case which is composed of a lower housing 210 and an upper cover 211 pivotally connected to the lower housing 210; an internal space 212 formed by the lower housing 210 and the upper cover 211 jointly; an input tray 220 movably mounted on a surface of the lower housing 210 for carrying unscanned documents; an output tray 221 disposed on an outer surface of the lower housing 210 for ejecting scanned documents; a document feeding assembly which is composed of a document feeding path 222 and a paper feeding unit 24; the document feeding path 222 disposed in the internal space 212 for communicating with the input tray 220 and the output tray 221, the document feeding path 222 being provided with a scanning position 223; the document feeding unit 24 disposed in the internal space 212 for feeding documents through the document feeding path 222, the document feeding unit 24 including a pick-up roller 241, a pick-up sensor 242, a feed roller 243, and a feed sensor 244; a camera holder 25 disposed on the surface of the case for securing the image capturing device 10 in an orientation directing to the scanning position 223 so as to capture the image of documents passing through the scanning position 223; an optical imaging unit 26 disposed between the camera holder 25 and the document feeding path 222 to ensure the photography width of the image capturing device 10 at the scanning position 223 is no shorter than the width of the unscanned documents; and an illuminate unit 27 arranged in the internal space 212 for controlling the exposure at the scanning position 223.

Because the angle of view of a general image capturing device 10 is fixed, the photography width can only be influenced by the distance between the image capturing device 10 and the unscanned documents to be photoed. In order to capture an entire document, the photography width must be wider than the width of the document, and the distance between the image capturing device 10 and the scanning position 223 must not be too short. Therefore, the volume of a document scanning apparatus would be increased. In this invention, the optical imaging unit 26 is arranged to minimize the volume of the automatic document feeding device 20. The optical imaging unit 26 includes three plane mirrors, the plane mirrors fold the optical path of the image capturing device 10, and thus the volume of the automatic document feeding device 20 is reduced. However, the quantity and the setting position of plane mirrors are only for illustration and should not be taken as a limitation. In another feasible embodiment, the optical imaging unit 26 includes optical devices selected from the group consisting of optical mirrors and optical lenses.

In a preferred embodiment, the automatic document feeding device 20 includes the following sub-modules 28: a signal transmitting module 281 for sending different messages to the image capturing device 10 according to different information needed to be transmitted; a feeding control module 282 for controlling the document feeding unit 24 to feed documents at a constant speed and suspending the feeding progress while any of abnormal states selected from the upper cover 211 is opened, the input tray 220 is emptied, paper jam occurs in the document feeding path 222 and the stop command given by the user is detected. The signal transmitting module 281 is implemented by executable codes programmed to send messages to the image capturing device 10.

Figure 4:
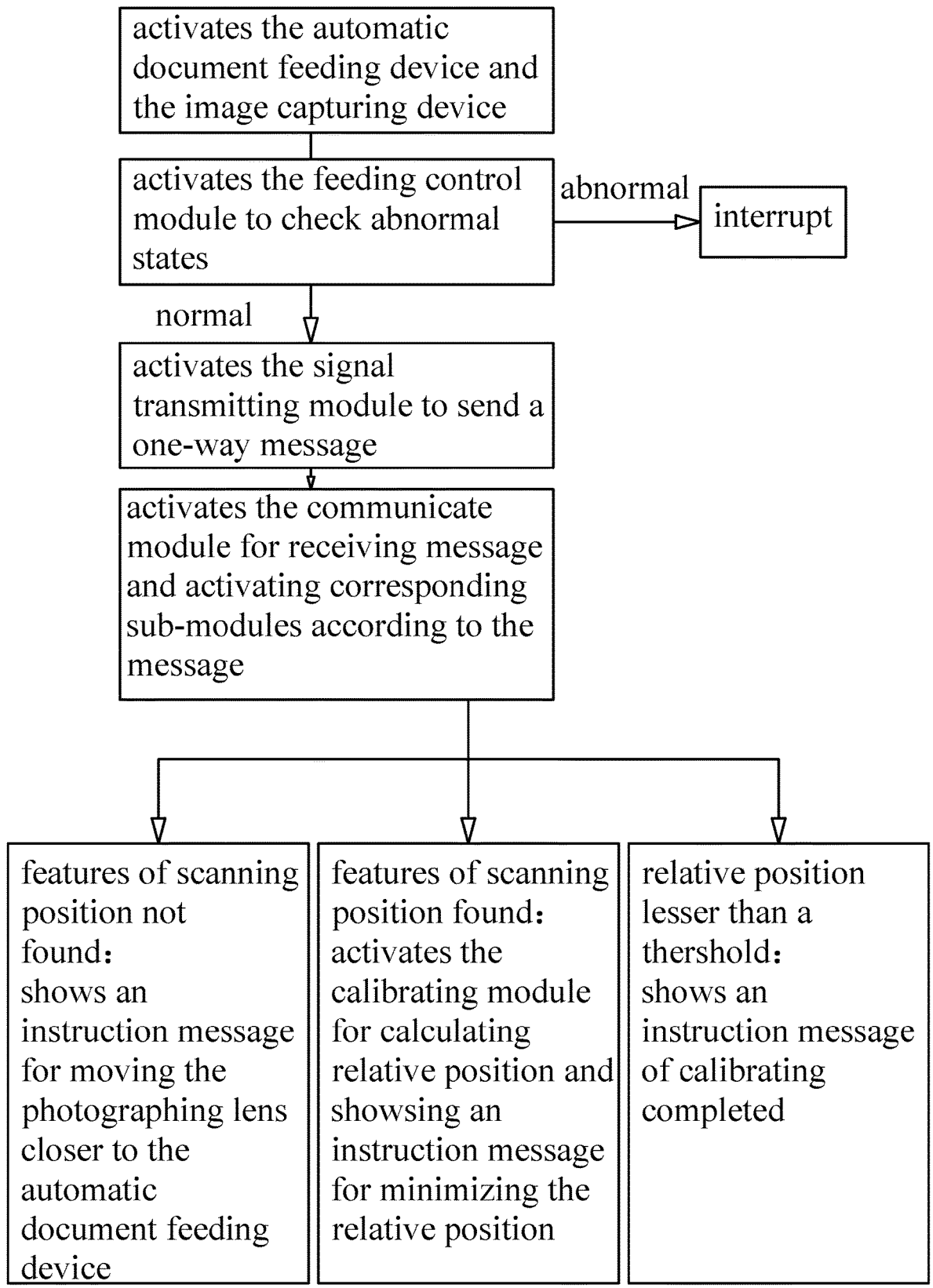
FIG. 4 shows a flow chart of combining the image capturing device with the automatic document feeding device.

Referring to FIG. 4 now, the flow of installing and positioning the image capturing device 10 on the automatic document feeding device 20 is shown. In order to ensure that the image capturing device 10 is able to capture the document image at scanning position 223 correctly, the image capturing device 10 and the automatic document feeding device 20 perform a series of steps to ensure the image capturing device 10 is fixed on the right position. The steps are described as follows:

The user starts the automatic document feeding device 20 and the image capturing device 10 used with the automatic document feeding device 20. The automatic document feeding device 20 activates the feeding control module 282, and the feeding control module 282 exams abnormal states including but not limited to: the upper cover 211 being opened, the input tray 220 being emptied, and a paper jam occurring in the document feeding path 222. If the abnormal state is not detected, a private area network is established between the automatic document feeding device 20 and the image capturing device 10. The private area network shown in this embodiment is realized by optical image recognition. The image capturing device 10 receives the message by capturing an optical image of the automatic document feeding device 20 and checking the optical image. Since the capabilities of capturing and processing images have been built into the image capturing devices 10 (smart phone, in this embodiment), there is no need to add any units for receiving or identifying message. And also, because the message sent by the automatic document feeding device 20 is an optical image, it is a one-way message so the automatic document feeding device 20 does not need to handshake with the image capturing device 10 or wait for any information sent by the image capturing device 10. Besides, the communication method here does not use public networks such as the Internet or the cellular network, but only needs to perform one-to-one communication in a short-distance area, so the setting cost of the signal transmitting module 281 can be reduced.

Then the signal transmitting module 281 is activated to send the messages to the image capturing device 10 through the private area network. The signal transmitting module 281 in this embodiment transmits the messages by controlling the illuminate unit 27, and the illuminate unit 27 adjusts the exposure at the scanning position 223 according to the message needed to send. However, it should be noted that it is just for illustration but not intended to be limiting. The one-way message can also be realized by other methods including but not limited to: texture, pattern, exposure, contrast and color of image.

The image capturing device 10 activates the communicate module 141 after being activated, and the communicate module 141 receives the messages by capturing images continuously at a fixed time interval by the image capturing unit 11 and executes one of the following operations according to the received messages.

If the received message does not contain the feature of the scanning position 223 at all, for example, the image is completely black or shows a pattern/outline other than the automatic document feeding device 20, the communicate module 141 performs an operation to show an instruction message for asking the user to move the image capturing unit 11 closer to the automatic document feeding device 20 on the touch screen panel 13.

If the received message contains the feature of the scanning position 223, the communicate module 141 activates a calibrating module 147. The calibrating module 147 performs an operation to calculate the relative position between the image capturing device 10 and the automatic document feeding device 20 and shows an instruction message for asking the user to minimize the relative position on the touch screen panel 13.

If the received message already contains the feature of the scanning position 223, and the relative position between the image capturing device 10 and the automatic document feeding device 20 is calculated to be less than a threshold, the calibrating module 147 performs an operation to show an instruction message of calibrating completed on the touch screen panel 13.

In conclusion, the signal transmitting module 281 in this embodiment sends an image containing the feature of the scanning position 223 to the image capturing device 10 as the message. And the calibrating module 147 calculates the relative position between the automatic document feeding device 20 and the image capturing device 10 according to the message and performs corresponding operations according to the relative position. However, the message here is just for illustration and should not be limited to the images showing the scanning position 223.

In another feasible embodiment, the signal transmitting module 281 can also establish a private area network between the automatic document feeding device 20 and the image capturing device 10 and send message that causes the image capturing device 10 to perform corresponding operation through other methods including but not limited to images, electroacoustic devices, wired communication signals and radio signals.

Figure 5:
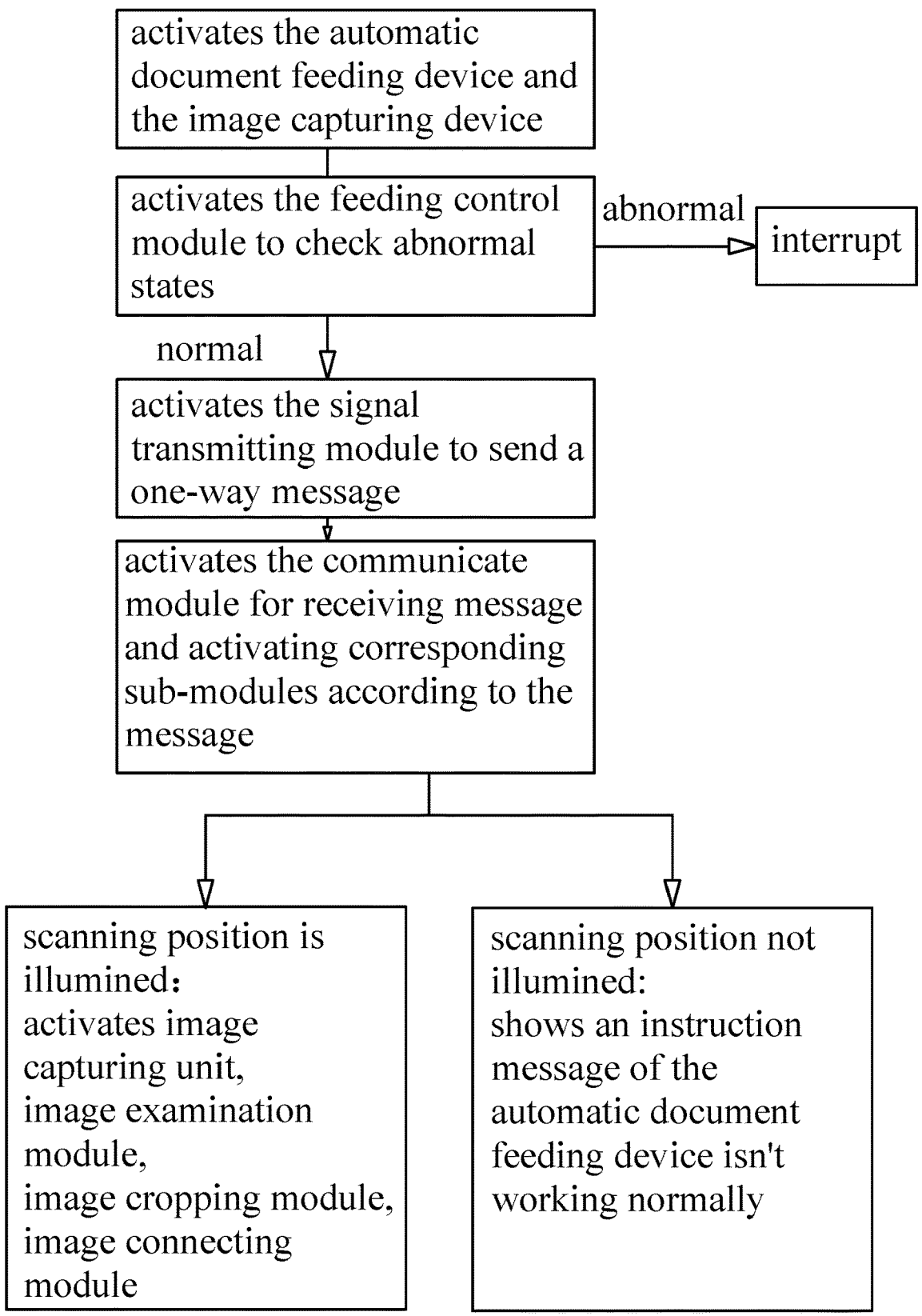
FIG. 5 shows a flow chart of an automatic scanning process in a preferred embodiment.

Referring to FIG. 5 now, the flow of the scanning after the assembly of the automatic document feeding device 20 and the image capturing device 10 is completed is shown. In order to achieve auto scan of multi-documents, the image capturing device 10 and the automatic document feeding apparatus 20 are controlled to perform the following operation steps:

The automatic document feeding device 20 activates the feeding control module 282 to check the abnormal states including but not limited to: the upper cover 211 being opened, the input tray 220 being emptied, a paper jam occurring in the document feeding path 222.

If the abnormal states are not detected, then the private area network is established between the image capturing device 10 and the automatic document feeding device 20 and the signal transmitting module 281 is activated to send the messages to the image capturing device 10 via the private area network. The signal transmitting module 281 in the present embodiment performs an operation for controlling the document feeding unit 24 to feed documents at a constant speed and the illumine unit 27 to illumine the scanning position 223.

The image capturing device 10 activates the communicate module 141 to receive the messages by capturing the images via the image capturing unit 11 at a fixed time interval and performs one of the following operations according to the received messages while activated.

If the received message contains the features showing that the scanning position 223 has been illumined, the communicate module 141 controls the image capturing unit 11 to capture the images of documents passing through the scanning position 223 at a time interval and store the images to the native image linkage. Simultaneously, the communicate module 141 activates the image examination module 142, the image cropping module 143, and the image connecting module 146 to perform corresponding operations. (The sub-modules here don't have to be activated in described order.)

If the received message contains the features showing that the scanning position 223 is not illumined, then the communicate module 141 controls the touch screen panel 13 to show an instruction message of the automatic document feeding device 20 is not operating normally.

In this embodiment, the message sent by the automatic document feeding device 20 is an optical image of the documents passing through the scanning position 223, and the image capturing device 10 judges if the automatic document feeding device 20 is ready to feed the documents according to the exposure of the received images. However, the message here is just for illustrative purposes but not limited to the exposure of the images.

In another feasible embodiment, the message sent by the signal transmitting module 281 for causing the image capturing device 10 to perform a corresponding operation is by image features including but not limited to: texture, pattern and color.

In another possible embodiment, the messages sent by the signal transmitting module 281 for causing the image capturing device 10 to perform a corresponding operation may also be sent via a personal area network through methods including but not limited to electro-acoustic devices, wired communication signals and radio signals, and the image capturing device 10 executes a corresponding operation in response to the messages.

Figure 6:
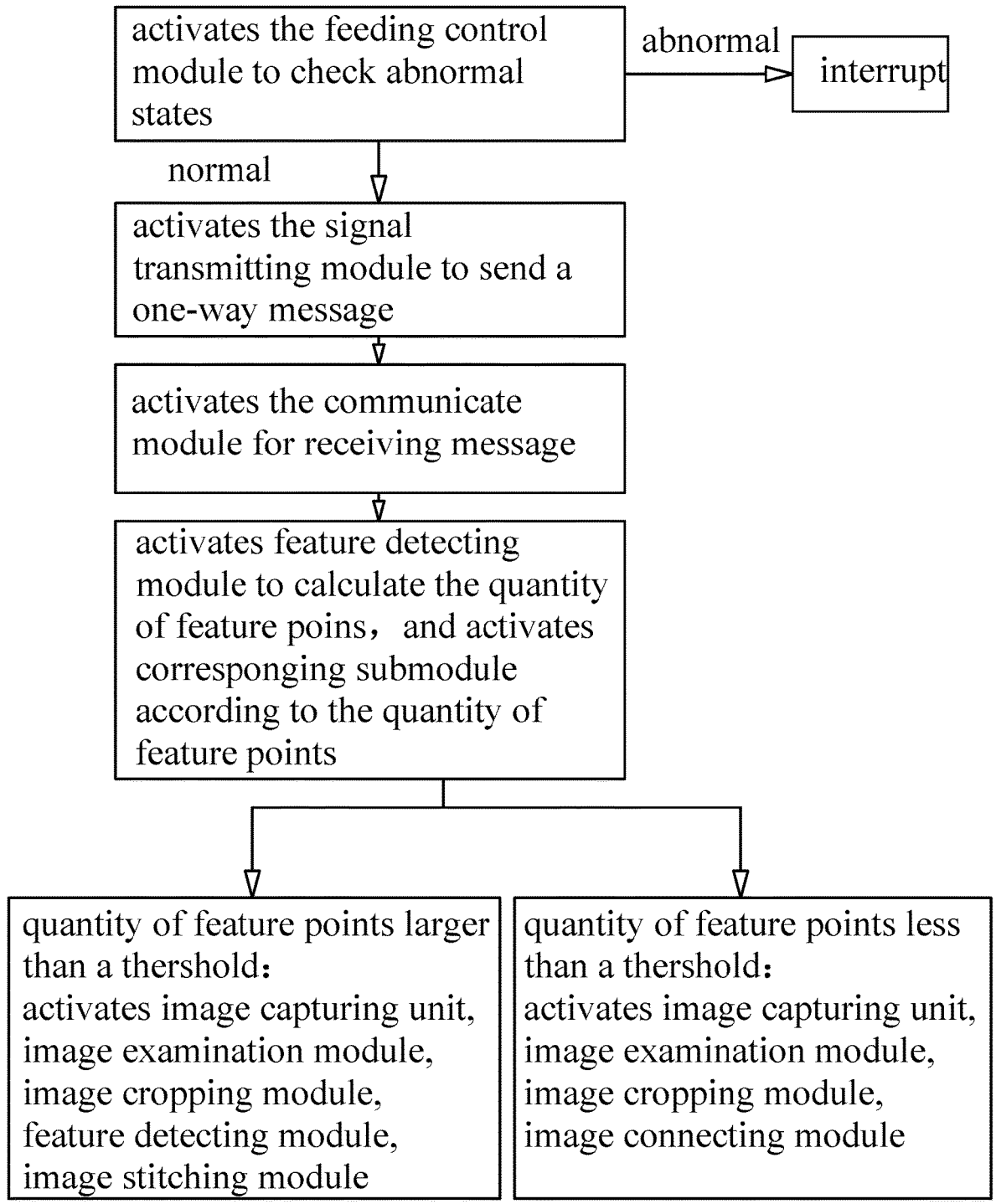
FIG. 6 shows a flow chart of an automatic scanning process in another preferred embodiment.

Referring to FIG. 6 now, after the assembly of the automatic document feeding device 20 and the image capturing device 10 is completed, the scanning process is going to start, and the flow of scanning is shown below. In order to achieve auto scanning of multi-documents, the image capturing device 10 and the automatic document feeding apparatus 20 are controlled to perform the following operations:

The automatic document feeding device 20 activates the feeding control module 282 for checking the abnormal states including but not limited to: the upper cover 211 being opened, the input tray 220 being emptied and paper jam occurring in the document feeding path 222.

If the abnormal states are not detected, then the private area network is established between the image capturing device 10 and the automatic document feeding device 20, and then the signal transmitting module 281 is activated to send the messages to the image capturing device 10 via the private area network. In this embodiment, the signal transmitting module 281 performs the operation for controlling the document feeding unit 24 to feed the documents at the constant speed and the illumine unit 27 to illumine the scanning position 223.

The image capturing device 10 activates the communicate module 141 while activated and the communicate module 141 receives the messages from the image capturing unit 11 by capturing the images continuously at a fixed time interval.

The image feature module 144 is activated to find the feature points contained in the messages and one of the following operations according to the quantity of the feature points is selected.

If the message includes the information of the automatic document feeding device 20 being ready to feed the documents, and the quantity of the feature points contained in the message is greater than a threshold, it means the information contained in the message such as patterns, texts or textures is large enough, and it is possible to stitch image blocks together accurately by using feature point comparisons.

At this moment, the image capturing device 10 controls the image capturing unit 11 to capture the images of documents passing through the scanning position 223 at a fixed time interval and store it in the native image linkage. Simultaneously, the image capturing device 10 activates the image examination module 142, the image cropping module 143, the feature detecting module 144 and the image stitching module 145 to perform corresponding operations. (The sub-modules here don't have to be activated in described order.)

If the quantity of the feature points contained in the message is less than the threshold, it means the documents may contains lots of blank or highly repeating textures. It is difficult to stitch image blocks together accurately in this situation. Therefore, the image blocks are connected into a full-page document images by connecting in fixed image lengths.

At this moment, the image capturing device 10 controls the image capturing unit 11 to capture the images of the documents passing through the scanning position 223 at a fixed time interval, and temporarily store it into the native image linkage, and activates the image examination module 142, the image cropping module 143 and the image connecting module 146 to perform their corresponding operations. (The sub-modules here don't have to be activated in described order.)

In this embodiment, the message sent by the automatic document feeding device 20 is the images of documents passing through the scanning position 223, and the image capturing device 10 performs corresponding operations according to the quantity of the feature points contained in the received images. However, it should be noted that the message above is just for illustrative and not limited to an image and the quantity of the feature points thereof.

In another feasible embodiment, the signal transmitting module 281 transmits the messages to the image capturing device 10 by a method including but not limited to texture, pattern, exposure and color of image, and the image capturing device 10 performs a corresponding operation in response to the messages.

In a further possible embodiment, the signal transmitting module 281 can also transmit messages to the image capturing device 10 via the private area network through methods including but not limited to electro-acoustic devices, wired communication signals and radio signals. The image capturing device 10 performs the corresponding operation in response to the messages.

In conclusion, the present invention discloses a document scanning apparatus and the scanning method with said document scanning apparatus. The method uses an image capturing device on hand to capture and process images, and thus achieves convenient carrying and reasonable cost of acquisition.

What is claimed is:

1. An automatic document feeding device for cooperating with an image capturing device so as to scan documents automatically, comprising:
   a case with an internal space;
   a document feeding assembly having a document feeding path arranged in the internal space for feeding the documents, the document feeding assembly being provided with a scanning position;
   a camera holder arranged on the case for securing the image capturing device in an orientation directing to the scanning position so as to capture images of documents passing through the scanning position;
   an optical imaging unit arranged between the camera holder and the document feeding path to ensure that a photography width of the image capturing device at the scanning position is not less than the width of the documents; and
   a signal transmitting module for sending messages to the image capturing device;
   wherein the image capturing device is selected from the group of smart phone, personal digital assistant, game device, digital camera and computer that have image capturing function, and the image capturing device is an external device separate from the automatic document feeding device.

2. The automatic document feeding device as claimed in claim 1, wherein the optical imaging unit comprises optical devices selected from a group of optical mirrors and optical lenses.

3. The automatic document feeding device as claimed in claim 1, further including an illuminate unit arranged in the internal space for exposing the scanning position.

4. The automatic document feeding device as claimed in claim 1, wherein the message sent by the signal transmitting module is an image of the scanning position.

5. The automatic document feeding device as claimed in claim 1, wherein the message sent by the signal transmitting module comprises information of relative position between the image capturing device and the automatic document feeding device.

6. The automatic document feeding device as claimed in claim 1, wherein the message sent by the signal transmitting module comprises information of the automatic document feeding device being ready to feed the documents.

7. The automatic document feeding device as claimed in claim 1, wherein the message is a one-way message.

8. A scanning method of a scanning apparatus composed of an automatic document feeding device and an image capturing device, the automatic document feeding device having a document feeding path, a scanning position and a camera holder, the scanning method comprising the steps of:
   using the camera holder to secure the image capturing device in an orientation directing to the scanning position so as to capture images of documents passing through the scanning position via the document feeding path;
   establishing a private area network between the automatic document feeding device and the image capturing device;
   transmitting a message to the image capturing device through the private area network; and
   causing the image capturing device to perform corresponding operations according to the message;
   wherein the image capturing device is selected from the group of smart phone, personal digital assistant, game device, digital camera and computer that have image capturing function, and the image capturing device is an external device separate from the automatic document feeding device to perform an operation for controlling an image capturing unit in the image capturing device to capture images of documents and temporarily store the captured image in a native image linkage when the message comprises information of the automatic document feeding device being ready to feed documents.

9. The scanning method as claimed in claim 8, wherein the message comprises an optical image captured by the image capturing device.

10. The scanning method as claimed in claim 8, wherein the message is sent to the image capturing device via the private area network selected from the group consisting of electroacoustic devices, wired communication signals, and radio signals.

11. The scanning method as claimed in claim 8, wherein the image capturing device performs an operation for displaying an instruction message of correcting relative position between the image capturing device and the automatic document feeding device when the message comprises information of a scanning position.

12. The scanning method as claimed in claim 8, wherein the message is a one-way message.

13. A scanning method of a scanning apparatus composed of an automatic document feeding device and an image capturing device, comprising the steps of:
   establishing a private area network between the automatic document feeding device and the image capturing device;
   transmitting a message to the image capturing device through the private area network; and
   causing the image capturing device to perform corresponding operations according to the message;
   wherein the image capturing device performs the following operations when the message comprises information of the automatic document feeding device being ready to feed documents, and:
   controlling an image capturing unit to capture images of documents passing through a scanning position and temporarily store the captured images into a native image linkage;
   extracting document images stored in the native image linkage, checking errors of exposure, focus and skew of the document images, and suspending the photography of the image capturing unit to readjust parameters of the image capturing unit when at least one of the errors is detected;
   extracting document images stored in the native image linkage, readjusting image contrast of the document images, cropping needed image blocks from the document images, temporarily storing the image blocks into a cropped image linkage and deleting the document images stored in the native image linkage;
   determining feature points in the document images; and
   extracting image blocks temporarily stored in the cropped image linkage, searching for same feature points existing in different image blocks and using the same feature points to stitch different image blocks into a full-page document image if a quantity of feature points determined in the previous operation is larger than a threshold.

* * * * *